United States Patent [19]
Ito et al.

[11] Patent Number: 5,396,063
[45] Date of Patent: Mar. 7, 1995

[54] OBJECTIVE REPLACING APPARATUS HAVING OBJECTIVE POSITION, DISPLACEMENT AND ADDRESS DETECTING MEANS AND MICROSCOPE USING IT

[75] Inventors: Toshinobu Ito, Fujisawa; Jun Matsuno, Zushi, both of Japan

[73] Assignee: Nikon Corporation, Tokyo, Japan

[21] Appl. No.: 264,254

[22] Filed: Jun. 22, 1994

Related U.S. Application Data

[63] Continuation of Ser. No. 69,399, Jun. 1, 1993, abandoned.

[30] Foreign Application Priority Data

Jun. 8, 1992 [JP] Japan .................................. 4-171533
Jun. 8, 1992 [JP] Japan .................................. 4-171534

[51] Int. Cl.$^6$ .................. G02B 21/00; G02B 21/06
[52] U.S. Cl. .................. 250/231.18; 250/201.3; 359/384
[58] Field of Search .............. 250/231.18, 216, 201.3, 250/205; 356/246; 359/381, 384, 385

[56] References Cited

U.S. PATENT DOCUMENTS

| | | | |
|---|---|---|---|
| 4,555,620 | 11/1985 | Bridson et al. | 250/205 |
| 4,725,720 | 2/1988 | Sawada et al. | 250/201.3 |
| 5,239,177 | 8/1993 | Canniff | 250/231.18 |

FOREIGN PATENT DOCUMENTS

56-93713 7/1981 Japan .
62-218915 9/1987 Japan .

*Primary Examiner*—David C. Nelms
*Assistant Examiner*—John R. Lee
*Attorney, Agent, or Firm*—Shapiro and Shapiro

[57] ABSTRACT

An apparatus for detecting a rotation operation of revolver is provided with a rotation direction detecting device for detecting a rotation direction of revolver by detecting a displacement of a position indication portion indicating a position of objective mount portion. In case that the rotation of revolver is carried out either in a manual manner or in an automatic manner, an address of mount hole in revolver which is to be next located at the predetermined position may be determined at start of rotation operation of revolver.

14 Claims, 9 Drawing Sheets

OBJECTIVE REPLACING APPARATUS HAVING OBJECTIVE POSITION, DISPLACEMENT AND ADDRESS DETECTING MEANS AND MICROSCOPE USING IT

This is a continuation of application Ser. No. 08/069,399, filed Jun. 1, 1993, now abandoned.

BACKGROUND OF THE INVENTION

1. Field of the Invention

The present invention relates to an objective replacing apparatus and a microscope using the apparatus. The objective replacing apparatus has a device for detecting an objective replacing operation. When the replacing apparatus, for example a revolver, is moved (rotated) to replace an objective with another, the detection device detects the rotation operation of revolver at rotation start. The microscope automatically controls adjustment of light quantity and adjustment of aperture diameter of aperture diaphragm with the detection device so that the illumination condition is adjusted suitable for a next coming objective being to be set in an optical path of microscope.

2. Related Background Art

There are microscopes provided with an objective replacing apparatus, a light control apparatus, and/or an aperture diaphragm apparatus, which are conventionally arranged as follows. A revolver is known as a conventional objective replacing apparatus. The revolver is held rotatable on a microscope and has a plurality of mount holes concentrically disposed around the rotation center of revolver. An objective is set in each mount hole. The revolver is rotated by an operator in a manual operation or by an automatic mechanism such as a motor, so that an arbitrary objective may be positioned in the optical path of microscope out of a plurality of objectives.

The conventional revolver had a device for detecting an address of each mount hole. There are various devices known for detecting an address of mount hole, for example as disclosed in Japanese Laid-open Utility Model Application No. 56-93713 or in Japanese Laid-open Patent Application No. 62-218915.

Such address detection devices are arranged such that when a desired mount hole is located in the optical path an address of the mount hole is then detected.

Accordingly, the conventional detection devices could not identify during movement of revolver an address of a next coming mount hole being to be set in the optical path, nor an objective set in the mount hole.

Conventional light control apparatuses are arranged such that a photo receptor is located in an observation path of microscope or in a photographic light path of TV camera or the like, that a light quantity of light from a source is detected by the photo receptor, and that the light quantity is adjusted to proper brightness by manually or automatically operating light quantity adjusting means such as a continuously variable ND filter to carry out a light control.

Such light control apparatuses, however, detect a light quantity of light emitted from the source and then passed through an objective, and then adjust the light quantity by operating the ND filter in accordance with the detected light quantity.

When the currently set objective is replaced with another objective having a different magnification by rotating the revolver, light is once shut in the field, because the objective is deviated from the optical path during rotation of revolver. The conventional light control apparatuses respond to this state with a decreased light quantity being detected by the photo receptor so that the ND filter is adjusted to become brighter.

Since brightness is detected after the next objective is located in the optical path and then the ND filter is operated in the conventional light control apparatuses, the apparatuses need a considerable time to obtain a proper light quantity, which interferes smooth observation.

In a microscope provided with such a light control apparatus, excessively bright light suddenly enters the optical path at the moment that the objective enters the optical path, which would cause eye fatigue of observer or which could deteriorate the photo receptor of TV camera. The influence appears great especially when a dark objective is replaced with a bright objective.

In addition, microscopes having an aperture diaphragm in the vicinity of condenser lens are arranged such that a resolution of image by objective, a contrast, a field of depth, and brightness may be adjusted through the aperture diaphragm. In the conventional microscopes an aperture ratio most appropriate to look could be set according to a sort of objective while an observer manually adjusts an opening diameter of aperture diaphragm. A technology was recently developed to automatically adjust the opening diameter of aperture diaphragm.

For example, often used is such an arrangement that the aperture diameter of aperture diaphragm is automatically adjusted in accordance with an objective set in a mount hole located at a stop position of revolver, using the aforementioned address detection device of mount hole in revolver.

The automatic adjusting device, however, starts the adjusting operation to optimize the opening diameter of aperture diaphragm after the revolver is stopped. Accordingly, the conventional microscopes permit no observation before the diameter of aperture diaphragm is adjusted, providing a problem of waiting time.

SUMMARY OF THE INVENTION

The first object of the present invention is to obtain an apparatus for detecting a rotation operation of revolver, which can determine a next objective being to be located at a predetermined position at an early stage of rotation of revolver. The second object of the invention is to obtain a microscope with the apparatus for detecting the rotation operation of revolver, which can start adjustment of light quantity, diameter of aperture diaphragm, or the like concomitant with replacement of objective early.

An apparatus for detecting a rotation operation of revolver according to the present invention is provided with rotation direction detecting means for detecting the rotation direction of the revolver by detecting a displacement of position indication part indicating a position of an objective mount portion.

The conventional microscopes can determine an address of next mount hole or an objective mounted in the next mount hole only either by a command signal of controller of motor-operated revolver in case that the revolver is automatically rotated or by detecting an address of mount hole after rotation in case that the revolver is manually rotated, whereas the apparatus of the present invention can determine an address of next mount hole in revolver being to be located at a predetermined position at the start of rotation operation of revolver when the revolver is manually or automatically rotated.

A microscope of the present invention is provided with the apparatus for detecting the rotation operation of revolver as described, so that the rotation direction of revolver may be identified thereby to enable determination of next objective being to be located in the optical path of microscope, whereby various adjustments may be early conducted based on the thus determined objective.

DESCRIPTION OF THE PREFERRED EMBODIMENTS

There will be described referring to FIG. 1 to FIG. 10 an apparatus for detecting the rotation operation of revolver, and a light control apparatus and an aperture diaphragm apparatus for microscope.

Figure 1:
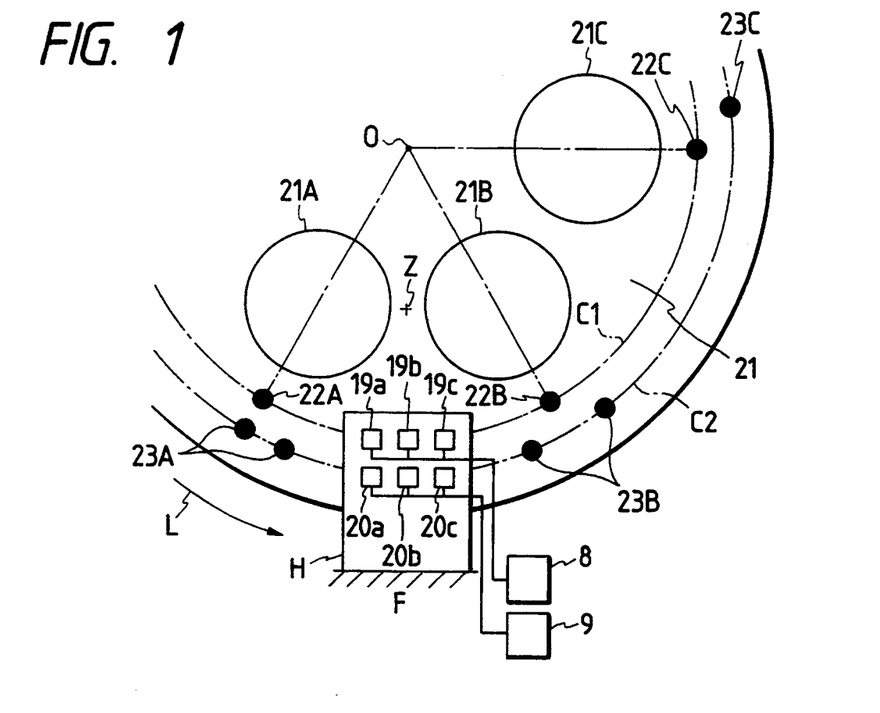
FIG. 1 is a drawing to show a main part of apparatus for detecting a rotation operation of revolver in an embodiment.
Figure 2:
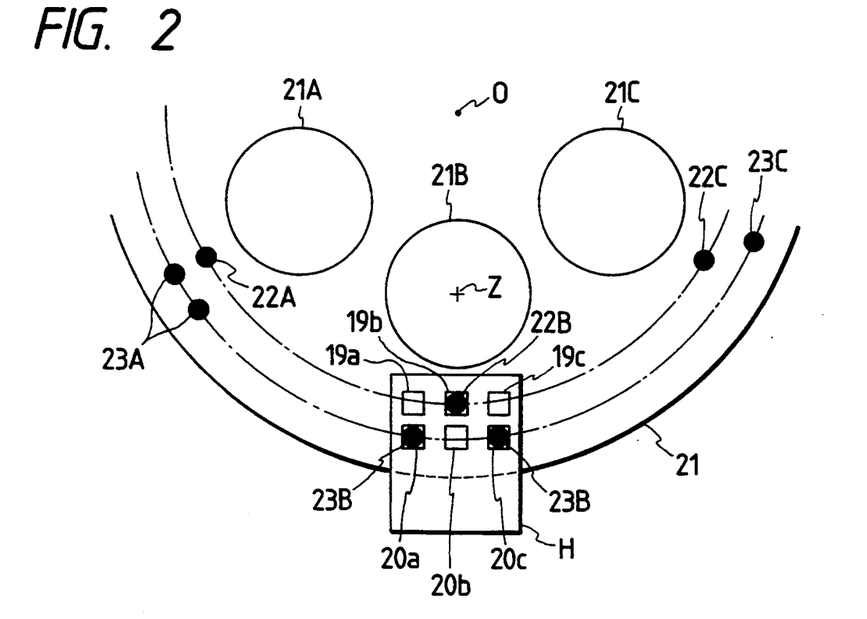
FIG. 2 is a drawing to show a state after the revolver 21 of FIG. 1 is rotated.

FIG. 1 and FIG. 2 show an embodiment of the apparatus for detecting the rotation operation of revolver.

In FIG. 1 reference numeral 21 designates a revolver, which is rotatably held on a fixed portion fixed in a microscope body. A plurality of objectives not shown are mounted at respectively predetermined positions in the revolver 21.

FIG. 1 shows objective mount holes 21A, 21B, 21C representing the predetermined positions.

Small disk permanent magnets 22A, 22B, 22C are attached to the revolver 21 at peripheral positions radially outside the objective mount holes 21A, 21B, 21C. These small permanent magnets 22A, 22B, 22C are for identifying a reference stop position of objective mount hole 21A, 21B, 21C. Each of the small permanent magnets is disposed on an intersection between an imaginary circumference C1 with the center at the rotation center 0 of revolver 21 and a straight line passing through the center of each objective lens mount hole and the rotation center 0 of revolver.

A plurality of small disk permanent magnets 23A, 23B, 23C (as will be collectively referred to as an address indication part) each for identifying an address of each mount hole 21A, 21B, 21C are mounted at peripheral positions further radially outside the imaginary circle C1. The address indication part 23 indicates an address of each mount hole by arranging the magnets among three locations, which can indicate eight ($2^3$) addresses at most.

A holder H is fixed at the position F (which is a part of the fixed portion) where it is kept as not interfering with the revolver 21 upon rotation. Hall IC sensors 19a, 19b, 19c (which will be collectively denoted by numeral 19) are mounted on the holder H. The Hall IC sensors 19a, 19b, 19c are located at superposing positions over the imaginary circumference C1, and are connected to a position/rotation direction detection part 8 for electrically converting a detection signal. The sensors 19a and 19c are used for rotation direction detection. The IC sensor 19b is used for detecting whether the mount hole is located at the predetermined position.

Hall IC sensors 20a, 20b, 20c (as will be collectively denoted by numeral 20) are disposed outside the Hall IC sensor series 19. The Hall IC sensors 20a, 20b, 20c are superposedly arranged over an imaginary circumference C2. A spacing between the Hall IC sensors is equal to a mount pitch of the magnets 23A, 23B, 23C. The Hall IC sensors 20a, 20b, 20c are connected to the address detection circuit 9 for electrically converting a detection signal.

Next described are the address detection and the position/rotation direction detection with the Hall IC sensors 19, 20.

The address detection circuit 9 outputs an address signal of mount hole, based on the predetermined arrangement pattern of small permanent magnets 23A, 23B, 23C detected by the Hall IC sensors 20a, 20b, 20c.

The position/rotation direction detection part 28 detects the position and the rotation direction by reading the position of small permanent magnet 22A, 22B, 22C through the Hall IC sensors 19a, 19b, 19c.

Figure 3:
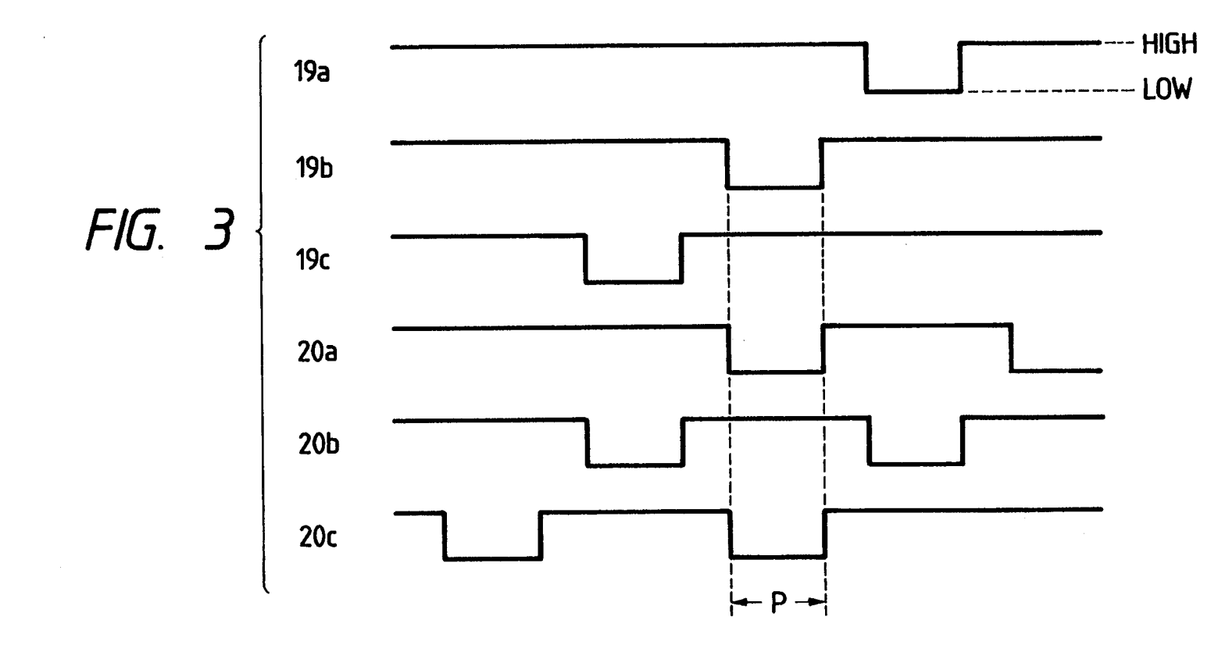
FIG. 3 is a drawing to show signals of respective sensors in holder H in FIG. 1.

The logic of revolver position detection and rotation direction detection is described referring to FIG. 2 and FIG. 3. The detection operation of rotation direction will be described with an example in which the objective mount hole 21B is set in the optical path, as shown in FIG. 2.

When the Hall IC sensor 19b at the objective mount hole 21B is on (active LOW) as in the LOW part of letter P in FIG. 3, the objective lens is in the optical path (only the optical axis Z of which is shown). Address data detected by the Hall IC sensors 20a, 20b, 20c become effective only in that state. Accordingly, the Hall IC sensor. 19b functions as a reference position sensor to define the stop position of revolver.

In FIG. 3, the Hall IC sensors 20a, 20b, 20c detect on, off, and on, respectively, during ON (active LOW) of the reference position sensor 19b to detect the predetermined revolver address.

The Hall IC sensors 19a, 19c are located on either side of the reference position sensor 19b. When the revolver 21 is rotated, the small permanent magnet 22B is slightly deviated in the direction of rotation to enter a sensitive range of either one of the Hall IC sensors 19a, 19c located along the rotation direction. This permits one to know in which direction the revolver 21 is rotated.

Figure 4:
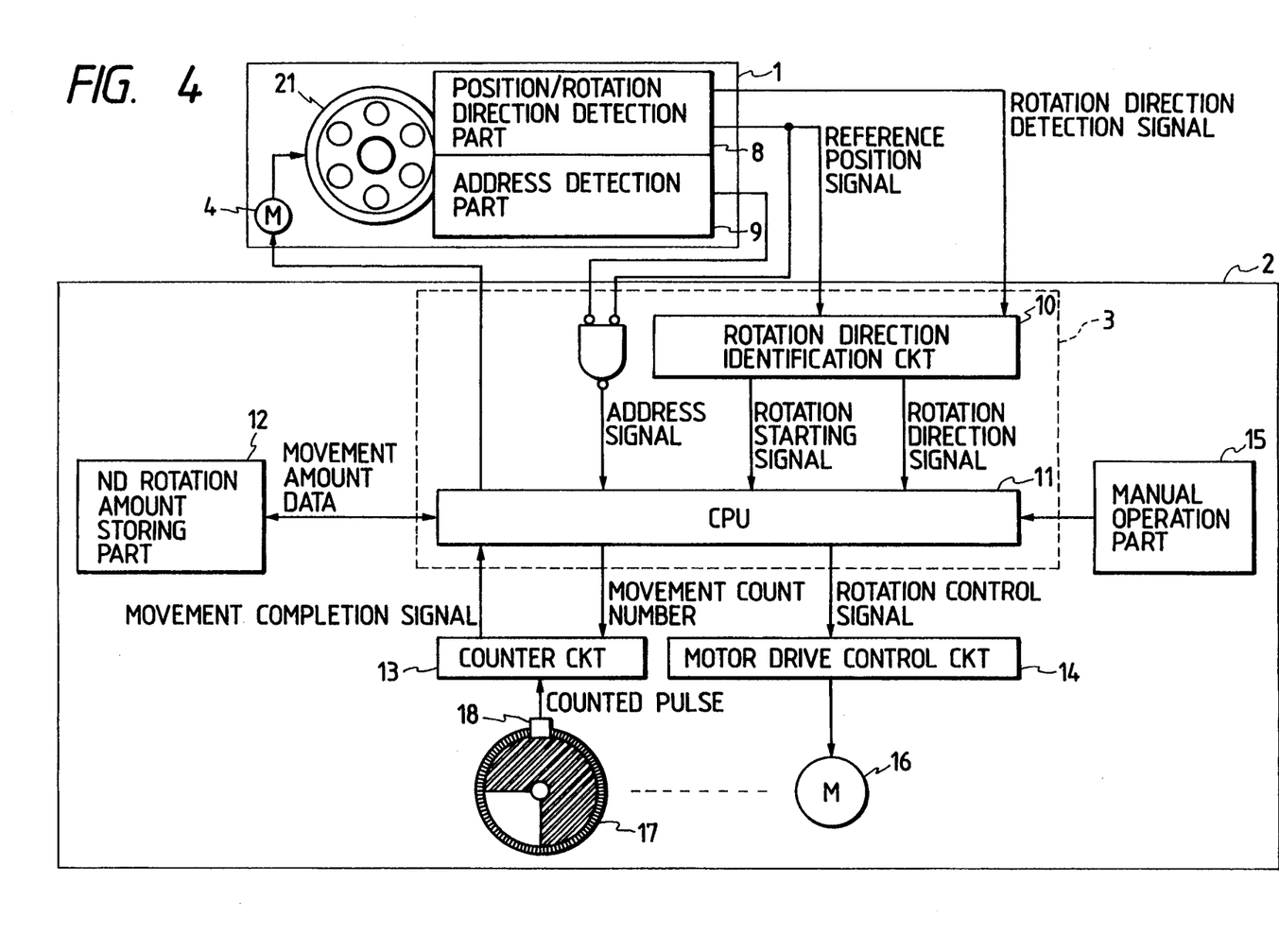
FIG. 4 is a drawing to show the construction of embodiment of a light control apparatus for microscope using the apparatus of FIG. 1.

The reference position signal and the rotation direction signal detected by these detection parts 8, 9 are output to a rotation direction identification circuit 10 provided inside the microscope, and the rotation direction identification circuit 10 outputs a revolver rotation direction signal and a revolver rotation start signal (see FIG. 4).

The position/rotation direction identification circuit 10 determines the rotation direction by detecting which sensor 19a or 19c in the rotation direction becomes LOW after the signal of the reference position sensor 19b is turned from LOW to HIGH as shown in FIG. 3.

This permits one to know an address of next mount hole, or a next objective being to be next set into the optical path at the same time with the rotation of revolver 21. Consequently, necessary data such as a light quantity suitable for the next objective may be known Substantially at the same time with the start of rotation operation of revolver.

Figure 5:
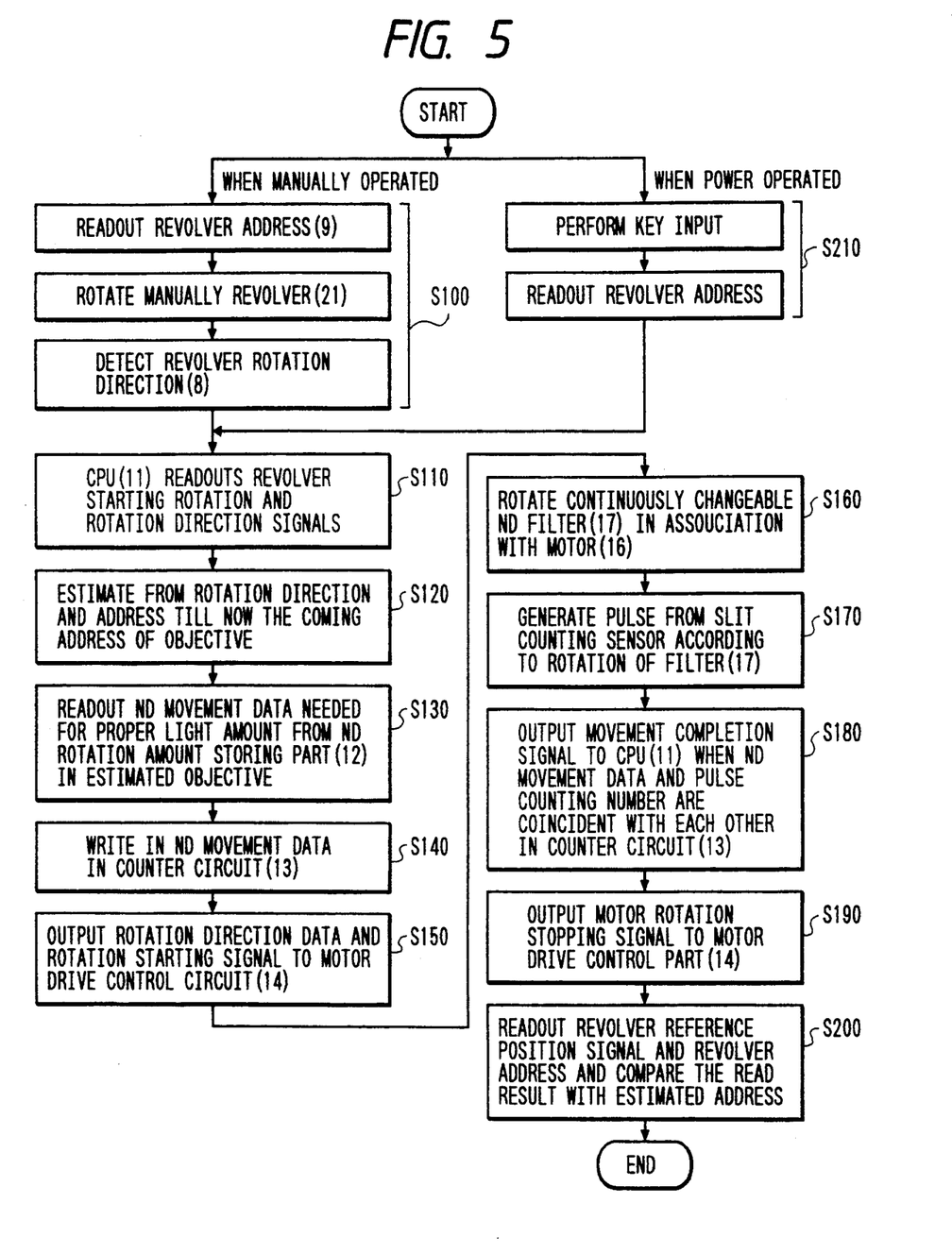
FIG. 5 and FIG. 6 are drawings to show a flowchart for the apparatus of FIG. 4.

Next described referring to FIG. 4 and FIG. 5 is a light control apparatus for performing a light control for the objective specified by the revolver rotation operation detection apparatus as described.

In FIG. 4 the above-described revolver rotation operation detection apparatus comprises the position/rotation direction detection part 8 enclosed in the revolver part 1, the address detection circuit 9, and the rotation direction identification circuit 10 incorporated in a control part 3 in a light control part 2.

The light control part 2 comprises an ND filter drive part 14, 16 for driving a continuously variable ND filter, which is variable light control means for adjusting a proper light quantity for an objective, an ND rotation amount storing part 12 storing rotation operation amounts of ND filter corresponding to respective objectives, and an ND rotation amount detection sensor part 13, 18 for feeding back the rotation amount of ND filter.

Further connected is a manual operation part 15 for inputting initial setting or change setting of proper light quantity data or the like for objective.

An operation of the light control apparatus is now described.

First described is the change-over of objective by manually rotating the revolver.

Suppose the reference position 22B of the current revolver is known through the sensor 19b and the revolver address is read by the address detection part 9, as described with FIG. 2. When the revolver 21 is rotated from this state in a certain direction (for example in the direction of L in FIG. 1), the position/rotation direction detection part 8 outputs a rotation direction detection signal (an output signal of IC sensor 19C) to the rotation direction identification circuit 10 (Step 100). The rotation direction identification circuit determines the rotation direction with the detection signal, and outputs a rotation start signal and a rotation direction signal. A CPU 11 reads these signals and the address signal from the detection part 9 (Step 110), and then identifies an address of next coming mount hole, that is, next objective (Step 120).

Then, the CPU 11 reads out from the ND rotation amount storing part 12 relative movement data about rotation direction and rotation amount of the continuously variable ND filter 17 from the present position in order to equalize a light quantity through the next objective being to be set into the optical path to the light quantity through the objective set in the optical path before start of rotation (Step 130).

The CPU 11 then writes the read relative movement data in the counter circuit 13, and gives the motor rotation direction and a command of rotation start to the motor drive control circuit 14 (Steps 140, 150). A DC motor 16 starts rotating with this rotation command signal, and the continuously variable ND filter 17 attached to the rotation shaft of DC motor 16 starts rotating in the predetermined direction (Step 160). While the continuously variable ND filter 17 is rotated, a slit counting sensor 18 detects slits formed on the peripheral edge of filter to generate count pulses (Step 170). The count pulses are then counted by the counter circuit 13, and a movement completion signal is output to the CPU. 11 when the movement count number and the counter pulse number set by the CPU 11 in the counter circuit 13 at Step 140 are coincident with each other (Step 180). This signal is read by the CPU 11, and then a motor stop signal is output to the motor drive control circuit 14 (Step 190). Receiving this stop signal, the motor is stopped and the revolver address detection signal is simultaneously read. It is checked whether the address is coincident with the revolver position anticipated as next (Step 200).

Next described is the change-over of objective by rotating the revolver 21 by means of motor. The revolver 21 is driven by a motor 4. The CPU 11 controls the motor 4, based on the operation of revolver rotation command switch provided in the manual operation part 15. The CPU 11 outputs a drive signal to the motor 4 when either a forward/backward rotation command signal of motor-operated revolver or an objective address assignment signal is output by operating the switch of the operation part 15. At the same time, the input signals are read to directly determine a next coming revolver address, or next objective (Step 210). Namely, data of rotation direction and rotation start can be obtained from the command signal or the assignment signal, and a next objective can be determined simply by reading an address from the detection part 9. Once the next objective is determined, the CPU 11 executes the light control in the same manner as in the manual rotation. The Hall IC sensor 19b may be omitted in case of motor-operated revolver, because it can be detected by another means whether a desired mount hole is located in the optical path.

The another means is as follows. Click grooves are formed at positions corresponding to the respective mount holes on the revolver 21. An engagement member such as a ball urged by a spring is provided on the fixed portion of revolver, which engages with a click groove when a desired mount hole is coincident with the optical path. When the revolver is rotated, a load on the motor 4 differs depending on whether the mount portion is located in the optical path or at a position other than the optical path. Thus, the another means is one to detect whether the desired mount hole is located in the optical path by detecting the difference of load.

Also, there may be a case that a light amount Passing through the objective is desired to be changed without changing the objective. In this case, the forward rotation/backward rotation switch in the manual operation part 15 is operated to rotation-adjust the aforementioned continuously variable ND filter 17 as to secure a determined light quantity.

When the objective is replaced with another after the continuously variable ND filter 17 was adjusted by such a manual operation, the CPU 11 adjusts the continuously variable ND filter 17 by a relative movement amount corresponding to a light amount difference between proper light quantities for old and new objectives from the position set by the manual operation. In other words, the amount set by the manual operation is kept as an offset. This arrangement assures a proper light quantity for each objective before and after replacement thereof.

Figure 6:
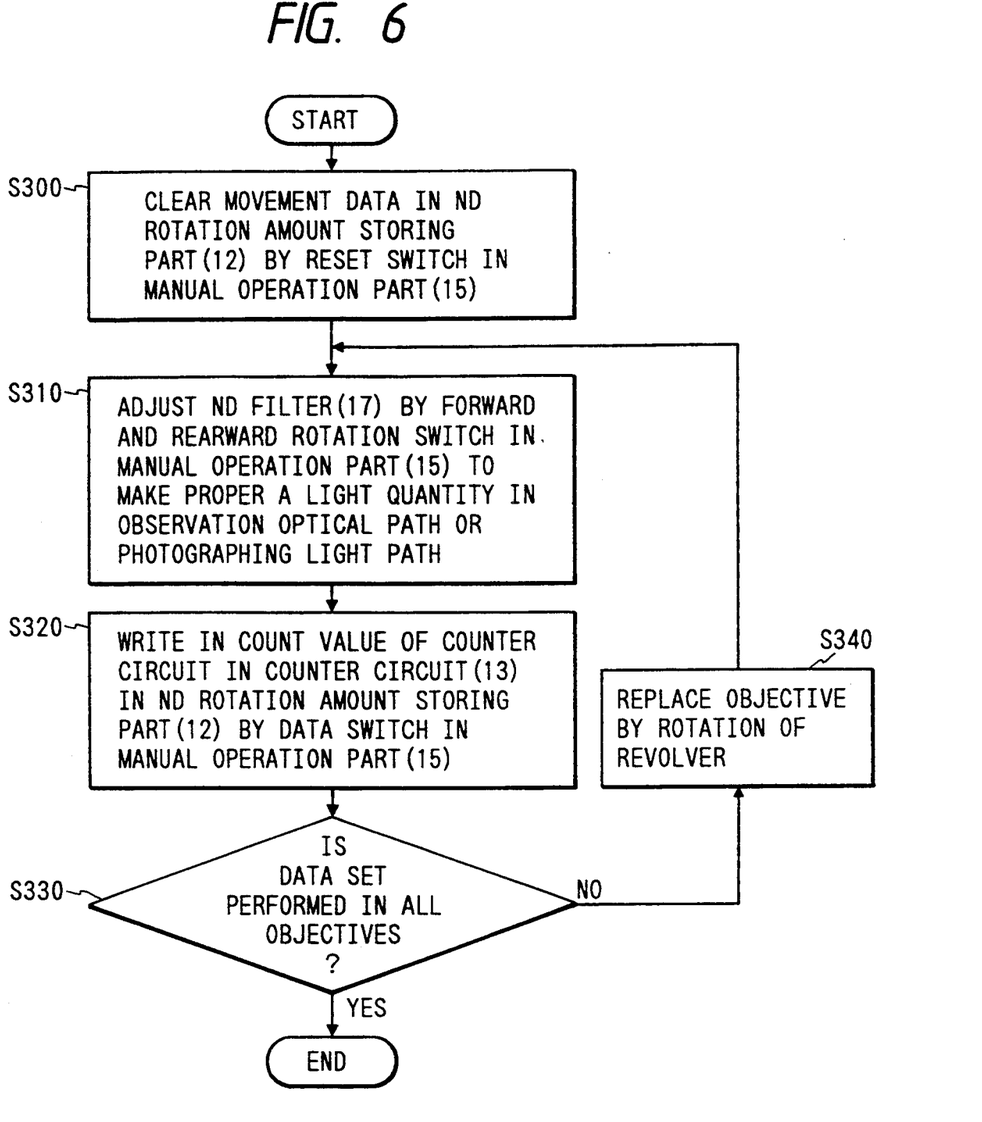

Next described referring to the flowchart shown in FIG. 6 is a process for storing relative movement data of the continuously variable ND filter for objectives set in the respective mount holes in revolver.

The manual operation part 15 has an initial setting switch (for reset and data setting) and the forward-/backward rotation command switch. The storage of relative movement data is carried out with these switches.

When the reset switch of initial setting switch is turned on, the CPU 11 clears movement data stored in the ND rotation amount storing part 12 (Step 300). Specifically, it writes initial value data in the counter circuit 13. A desired objective is then set in the optical path of microscope, and the forward/backward rotation switch in the manual operation part 15 is operated to rotate the continuously variable ND filter 17. By this operation, the light quantity is adjusted to be suitable for an observation optical path or a photographic optical path for example for TV camera (Step 310). When a suitable light amount is set, the data setting switch in the manual operation part 15 is pressed to write the movement count value of counter circuit 13 at this moment in the ND rotation amount storing part 12 (Step 320). Similarly, relative movement data for all objectives set in the revolver may be consecutively stored in the storing part 12 (Steps 330, 340). A difference between objectives may be calculated with absolute count value as read value to obtain the data.

There is another method for inputting the relative movement data for each objective different from the above method. The another method is as follows. Information (magnification, NA, etc.) on objectives set in the respective mount holes is input from the outside. A difference of proper light quantity is calculated between objectives, based on the Objective information. The data is converted into a corresponding rotation direction movement amount (count value) of continuously variable ND filter 17, and stored in the ND rotation amount storing part 12. This data input method has an advantage that there is no need to store the relative movement data, based on brightness adjustment with the continuously variable ND filter 17 for respective objectives prior to observation.

A pulse motor may be employed as the driving motor 16 in place of DC motor. Such a modification may obviate the rotation angle detection sensor such as the slit counting sensor 18. Namely, the continuously variable ND filter may be rotation-adjusted in open-loop control by inputting pulse string for drive control directly into the counter circuit 13 and counting it.

In contrast, the aforementioned light control apparatus performs a semi-closed loop control to detect a rotation amount of continuously variable ND filter 17. The light control apparatus of the present invention may also employ a closed-loop control to obtain the proper light quantity by detecting a light quantity of light from a source having passed through the ND filter, and feeding back the state to the set value in order to Judge if the set density of ND filter is appropriate.

Since the Hall IC sensor series 19 for detecting the position of objective mount hole, which is used in the revolver rotation operation detection apparatus as described, is for use in detection of rotation direction, it may be omitted if the revolver is manually rotated. Also, although the rotation direction is determined with the three Hall IC sensors 19a, 19b, 19c in the above embodiment, the rotation direction of revolver may be detected by a phase difference of generated signals. In this case, the number of sensors may be decreased. Further, although the above embodiment employs the Hall IC sensors to detect the position and the address, position detecting means such as the photoelectric transmission slit sensor or the reflection type photo interrupter may be set on the revolver.

Figure 7:
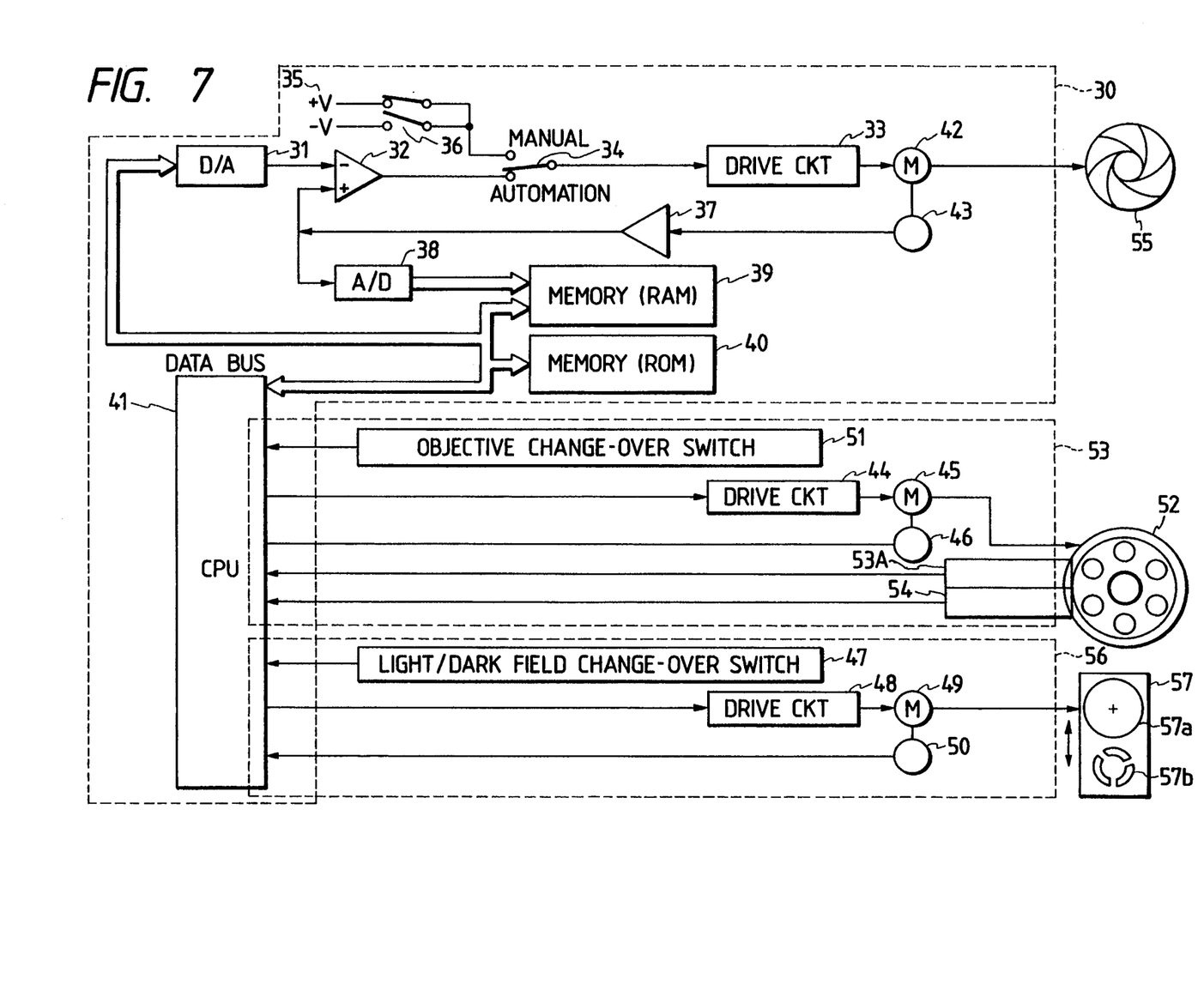
FIG. 7 is a drawing to show the construction of embodiment of an aperture diaphragm apparatus for microscope using the apparatus of FIG. 1.

The construction of an aperture diaphragm apparatus is next described referring to FIG. 7.

In FIG. 7 a control circuit 30 for aperture diaphragm adjustment is composed mainly of an automatic/manual change-Over switch 34, a manual aperture diaphragm switch 36, a D-A converter 31, a differential amplifier 32, a drive circuit 33, an A-D converter 38, a memory (RAM) 39, a memory (ROM) 40, and a CPU 41. The automatic/manual change-over switch 34 is for change-over between an automatic setting mode in which the aperture diaphragm is automatically set in response to the rotation of revolver 52 and a manual setting mode in which the opening degree of aperture diaphragm may be freely set by motor drive upon setting an arbitrary aperture ratio. The manual aperture diaphragm switch 36 performs an open or close operation of diaphragm while switching an applying voltage ($+V$, $-V$) of the source 35 by change-over of switch in the manual setting mode. The D-A converter 31 converts the aperture ratio data of digital signal output through a data bus into an analog signal in the automatic setting mode. The differential amplifier 32 compares an output signal of the D-A converter 31 with a feedback voltage signal obtained by amplifying a signal from a potentiometer 43 of an aperture diaphragm motor 42 through an amplifier 37. The drive circuit 33 drives the aperture diaphragm motor 42 with this comparison signal. The A-D converter 38 performs the analog-to-digital conversion of the value of the potentiometer 43 obtained at the time of setting of aperture ratio. The memory 39 stores the digital data after the A-D conversion. The memory 40 stores the initially set aperture rate of aperture diaphragm. The CPU 41 controls data transmission between the memories 39, 40 through the data bus.

A motor-operated revolver drive control circuit 53 for switching objectives includes an objective change-over switch 51, a part of CPU 41, a drive circuit 44, a motor 45, and a position sensor 46. The objective change-over switch 51 is disposed on an operation part of microscope, and an observer operates the revolver 52 through this switch 51. The part of CPU 41 receives an operation signal from the switch 51 and outputs a control signal after a process of predetermined feedback. The drive circuit 44 controls the motor 45, based on the control signal. The position sensor 16 feeds the position of the revolver motor 15 back to the CPU 41. The control circuit 53 further has an address detection part 53A of objective mount hole in revolver 52 and a position/rotation direction detection part 54.

Moreover, a light/dark field change-over switch control circuit 56 has a light/dark field change-over switch 47, a part of CPU 41, a drive circuit 48, a motor 49, and a position sensor 50. The switch 47 is provided on the operation part of microscope as to allow the observer to change over the observation method. The CPU 41 receives an operation signal from the light-/dark field change-over switch 47 and controls the drive circuit 48 with the predetermined feedback. The drive circuit 48 drives the motor 49 under the control of CPU 41 to effect the change-over between a light field and a dark field. The position sensor 50 feeds the position of the light/dark field change-over motor 49 back to the CPU 41.

Operations of the circuits in the aperture diaphragm apparatus so arranged will be described referring to FIG. 7 to FIG. 10.

A standard change-over operation of objective is first explained.

After the observer sets a plurality of objectives (not shown) in the motor-operated revolver 52, he or she conducts an operation to store a relation between the respective lenses and the revolver mount positions in the memory 40. This operation is sequentially carried out according to an instruction on an instruction screen of display provided on a panel having the operation switch of microscope.

Figure 8:
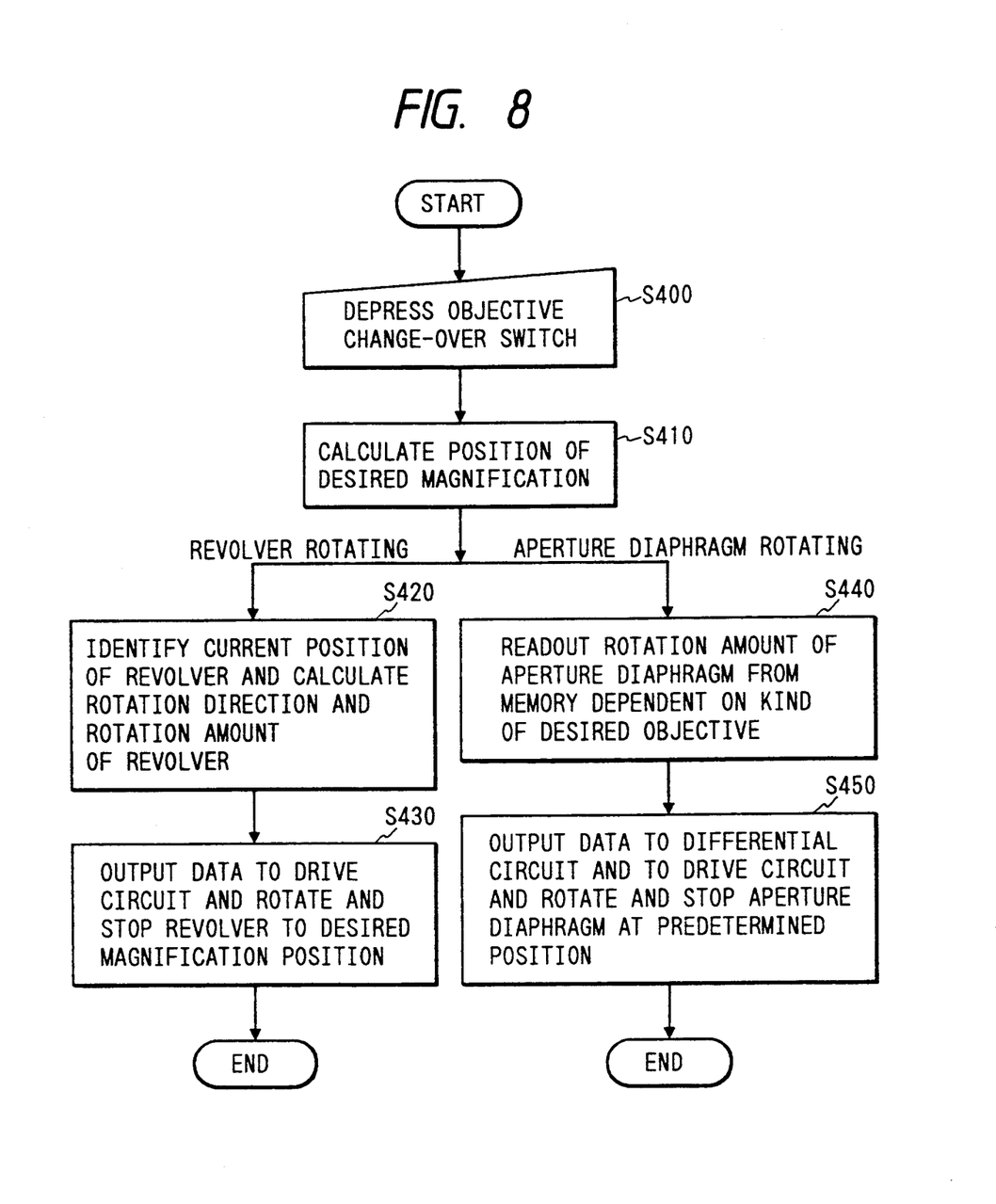
FIG. 8, FIG. 9, and FIG. 10 are drawings to show a flowchart for the apparatus of FIG. 7.

After that, when the observer operates the objective change-over switch 51 on the operation part to change the objective for example into one having 20 magnifications during observation (Step 400), the CPU 41 calculates a mount hole in which the objective of 20 magnifications is set, from a signal of switch 51 and an address of address detection part 53 (Step 410).

After that, the rotation operation of revolver 52 and the aperture diaphragm rotation operation are carried out in parallel. In the revolver rotation operation the CPU 41 first calculates a rotation direction and a rotation amount from the present position of revolver 52 to the position of mount hole for the objective of 20 magnifications (Step 420). The CPU 41 outputs a drive signal based on the calculated value to the drive circuit 44, and the drive circuit 44 rotates the revolver motor 45 based on the drive signal. The revolver is rotated up to a desired magnification position to set the objective of 20 magnifications while the rotation amount of motor 45 is fed back from the position sensor 46 to the CPU 41 (Step 430).

The open-close operation of aperture diaphragm 55 is also carried out simultaneously with the above operation. The CPU 41 first reads out from the memory (ROM) 40 rotation amount data of motor 49 for obtaining an aperture diameter of aperture diaphragm corresponding to a standard aperture ratio (for example 75%) of objective of 20 magnifications (Step 440). The data signal is subjected to the digital-to-analog conversion in the D-A converter 31 and then to a predetermined control, and the thus converted signal is output through the drive circuit 33 to the aperture diaphragm motor 42 to conduct the open/close operation of aperture diaphragm 55. An output of the aperture diaphragm motor 42 is fed back to the potentiometer 43 connected thereto, a difference from the command value of the CPU 41 is obtained, a deviation signal is again output to the aperture diaphragm motor 42, and the aperture diaphragm motor 42 is stopped at the position of standard aperture ratio (Step 410). In case that the operation time of aperture diaphragm is shorter than the change-over time of objective, a waiting time of user is just the change-over time of objective. On the other hand, if the relation is reversed, the waiting time is just the operation time of aperture diaphragm.

Figure 9:
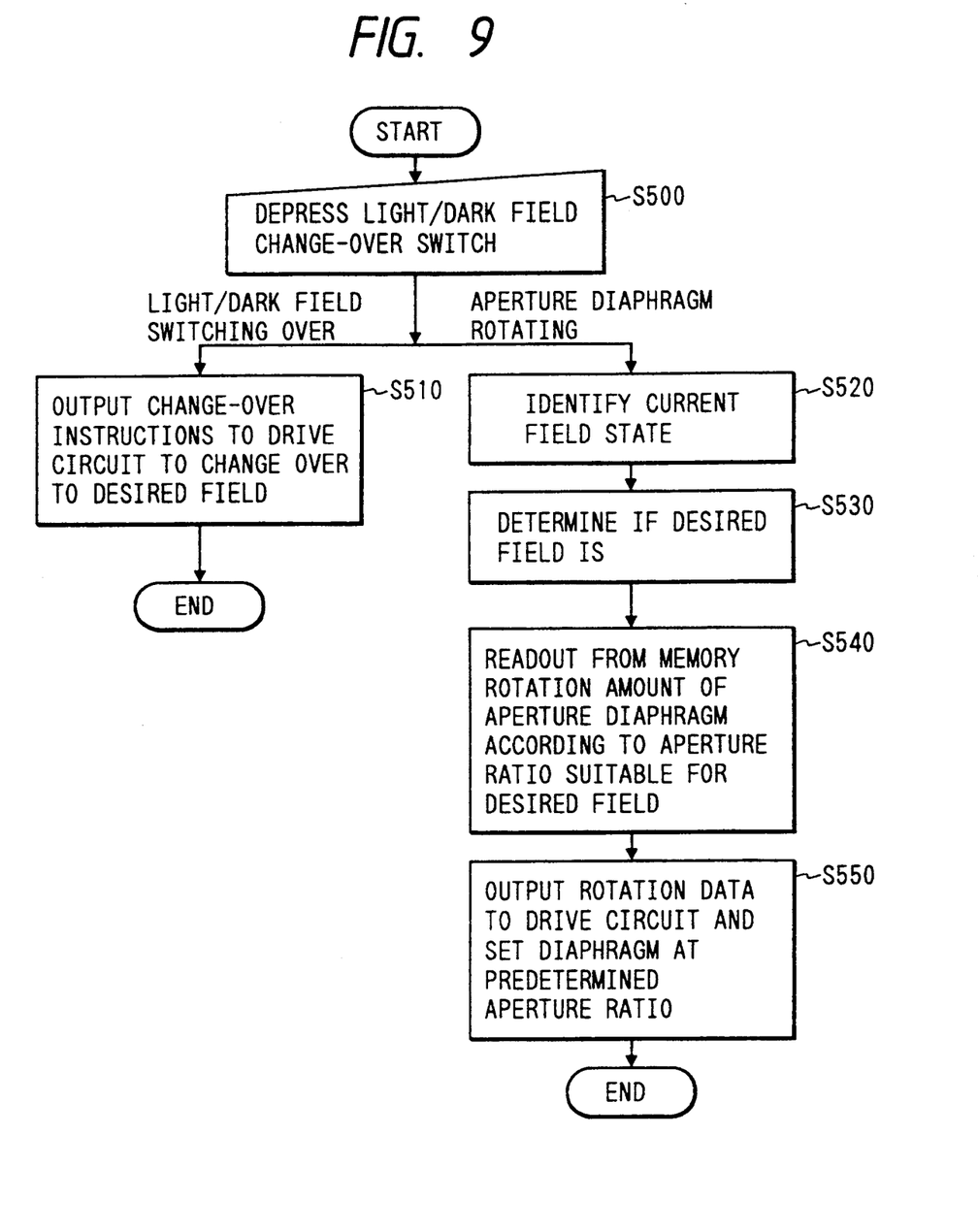

Adjustment of aperture diaphragm in light/dark field change-over is next described with reference to FIG. 7 and FIG. 9.

The following example illustrates a case of change-over from a light field to a dark field.

When the light/dark field change-over switch 47 is operated, a field change-over operation signal is output to the CPU 41 (Step 500).

After that, the light/dark field change-over operation and the aperture diaphragm rotation operation are carried out in parallel. In the light/dark field change-over operation, when the CPU 41 receives a change-over command, it outputs a dark field changeover command to the drive circuit 48 and carries out the field change-over operation by the light/dark field change-over motor 49 through the drive circuit 48 (Step 510). The field change-over operation is an exchange operation of the light field diaphragm 57a and a dark field diaphragm 57b as shown in FIG. 7.

Also simultaneously with this operation, the aperture diaphragm positioning operation similar to that as described above is carried out to set an aperture ratio of the aperture diaphragm 55 suitable for the dark field (normally full open). Namely, a present field state is first identified (Step 520); a desired field is determined from this result (Step 530); an operation amount of aperture diaphragm corresponding to the aperture ratio fit for the desired field is read out from the memory (ROM) 40 (Step 540); and after conversion it is output to the drive circuit 3 to set the aperture at the desired aperture ratio (Step 550).

In case that the operation time of aperture diaphragm is shorter than the change-over time of light/dark field, a waiting time of user is just the change-over time of light/dark-field. In case that the relation is reversed, the waiting time is just the operation time of aperture diaphragm.

Figure 10:
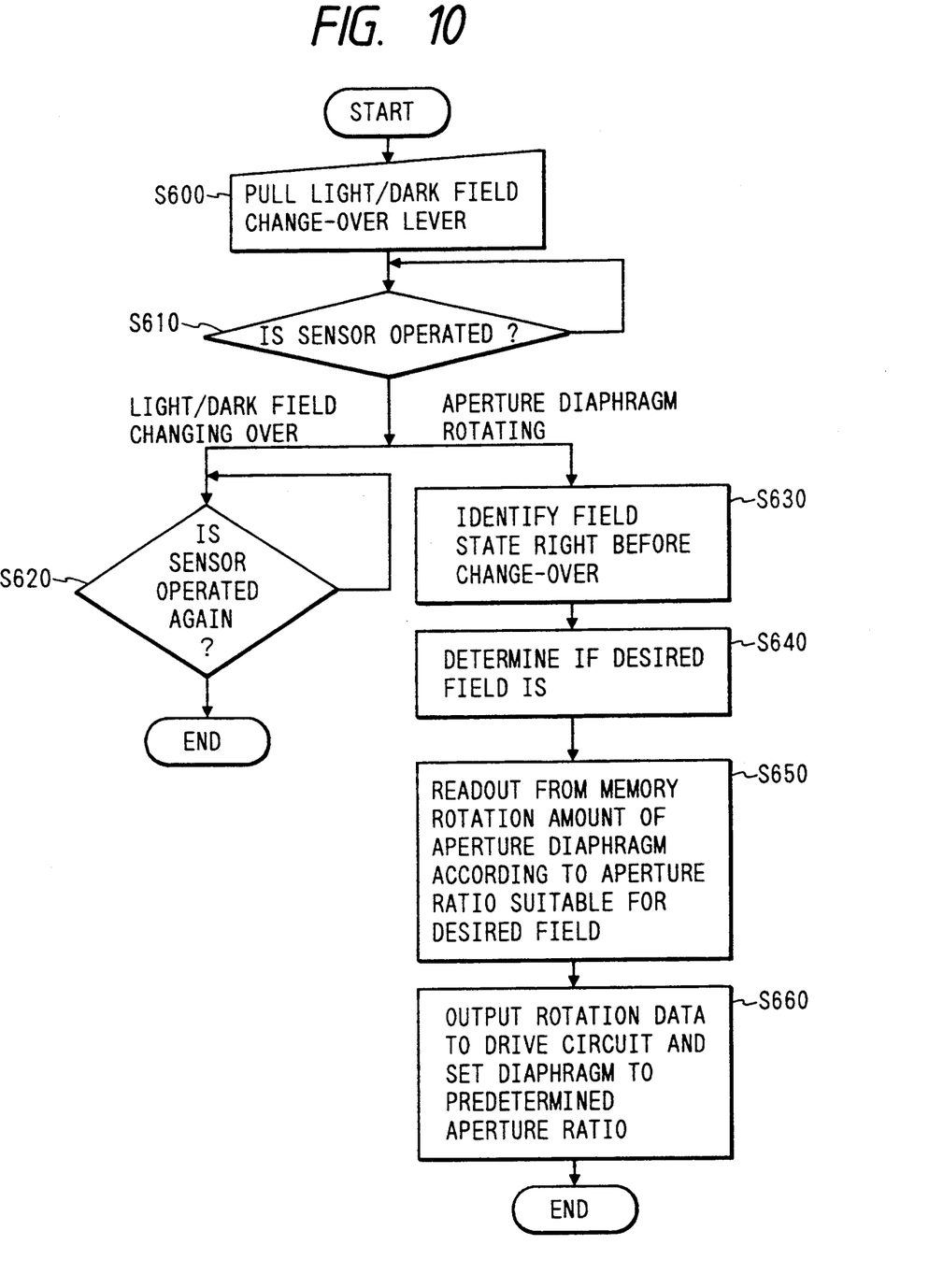

Next explained with FIG. 10 is a case that the light-/dark field change-over is manually carried out.

Generally in case of manual light/dark field change-over, the field State is switched by operating a change-over lever (not shown) and moving a field diaphragm plate to a predetermined position (Step 600). Thus, it is judged in case of manual change-over whether the change-over is carried out, using a current position sensor for detecting a current field diaphragm plate position (Step 610). The current position sensor is for example a micro switch. The switch is so arranged that it outputs an off signal when the diaphragm 57a of field diaphragm plate 57 is set in the optical path and that it outputs an on signal when the diaphragm 57b is located in the optical path. Accordingly, a field state desired to be changed may be discriminated from that before change, using the operation state of this switch.

Also in this case, the manual light/dark field change-over operation and the aperture diaphragm open/close operation are carried out in parallel. First, in the light-/dark field change-over operation, when the field diaphragm is set in the other field state, the current position sensor is operated to identify the change-over completion (Step 620).

Additionally, the aperture diaphragm open/close operation is carried out at the same time with this operation. The previous field state before change-over and a desired field are determined with the sensor change-over operation (Steps 630, 640). An operation amount of aperture diaphragm corresponding to an aperture ratio fit for the desired field is read out from the memory (ROM) 40 (Step 650), and after conversion it is output to the drive circuit 33 to set the diaphragm at the predetermined aperture ratio (Step 660).

Next explained with FIG. 7 is the procedure for setting an arbitrary aperture ratio and storing it in memory with necessity.

First, the automatic/manual change-over switch 34 is turned into the manual side and the manual aperture diaphragm switch 36 is operated for example to open the aperture diaphragm 55, whereby a voltage $+V$ is applied from the power source 35. The drive voltage is output through the drive circuit 33 to the aperture diaphragm motor 42 to rotate the aperture diaphragm 55 in the opening direction. When the observer Judges that the image contrast is proper for example in observation of 10 magnifications in this state, the switch 36 is made open to stop the opening operation of aperture diaphragm. An output of the potentiometer 43 at this moment is subjected to the analog-to-digital conversion through the A-D converter 38 and the converted signal is then stored as digital data in the memory (RAM) 39. since the standard aperture ratio preliminarily set in the apparatus is stored in the memory (ROM) 40, the arbitrary aperture ratio will never be overwritten on the standard aperture ratio in this occasion. The arbitrary aperture ratio is thus set by the user's setting for 10 magnifications.

Since then, the CPU 41 will read the arbitrary aperture ratio stored in the memory (RAM) 39 and automatically set it as the initial value for objective of 10 magnifications. In case that the aperture ratio is temporarily changed for observation, an instruction may be given to withhold the arbitrarily set aperture ratio from being stored in the memory (RAM) 39. In this case, the standard aperture ratio in the memory (ROM) 40 will be read out upon next revolver rotation operation or next light/dark field change-over operation.

As described, an optimum aperture ratio may be readily selected while looking at an image through the microscope, and the selected aperture ratio may be stored in the memory. Since the memory used in this operation is RAM, a very high degree of freedom is secured for erasure and rewriting of data. Also, a plurality of aperture ratio data may be stored for respective observers or for respective samples. The data representing the relation between the objectives and the aperture ratios, stored in the memory (RAM) 39 and the memory (ROM) 40 through the data of CPU 41, may be transferred to various record media or to an external memory device through a personal computer.

For example in an application of microscope for inspection of products, the same inspection standard may be set for a plurality of inspection instruments while enjoying the advantage that a difference between the instruments may be obviated in inspection.

In the above embodiment (FIG. 7–FIG. 10), the CPU 41 read the rotation instruction of revolver through the switch 51 and preliminarily identified the next objective being to be set. However, the present embodiment includes the detection part 53, 54, so that as in the embodiment detailed with FIGS. 4–6 the aperture diaphragm open/close operation may be carried out in parallel with the rotation operation of revolver even if the revolver is manually rotated. The detection part 53, 54 is constructed and operated in the same manner as the holder H and the detection circuits 8, 9 as described in FIGS. 1–3 and FIGS. 4–6, and therefore is omitted to explain here.

In the above embodiment, the trigger of aperture diaphragm open/close operation was the start of objective change-over or light/dark field changeover, but the operation may be started with a command from an independent change-over switch or from an external operation device through a certain input/output interface by a software installed in a personal computer.

For example, if numerous combination data of users, samples, and objects with aperture ratios are preliminarily stored in a memory, optimum combination data may be instructed from an external computer in accordance with a user actually using the microscope or a sample to be inspected, or the data may be freely selected.

Although the embodiment is fully equipped, the switch 51, the motor 45, the drive circuit 44, and the position sensor 46 may be omitted in case of manual revolver.

In the above description of the embodiments, the revolver was employed as an example of objective change-over part. In the present invention, however, the objective change-over means may be so arranged that objectives are arranged on a line, as in the field diaphragm of FIG. 7, and that the change-over means is translationally moved to replace an object with another.

Although the apparatus for detecting the rotation operation of revolver is separately described from the light control apparatus and the aperture diaphragm apparatus for easy understanding in the description of the embodiments, the microscope equipped with all apparatuses is the best.

Further, the embodiments using the apparatus for detecting the rotation operation of revolver were shown as applications for the light control apparatus and the aperture diaphragm apparatus, but it may be applied for another apparatus, for example for the field diaphragm apparatus. In addition, the light source may be controlled to increase or decrease the light quantity. Further, the stage may be controlled to move vertically to avoid the interference between the objective and the stage.

What is claimed is:

1. An objective replacing apparatus comprising:
   objective replacing means having a plurality of objective mount portions and selectively positioning at a predetermined position a desired objective out of a plurality of objectives set in said mount portions;
   a position indication portion for indicating respective positions of said plurality of mount portions, said position indication portion being disposed on said objective replacing means as to be formed corresponding to said respective mount portions;
   an address indication portion indicating respective addresses of said plurality of mount portions, said address indication portion being disposed on said objective replacing means as to be formed corresponding to said respective mount portions;
   means for detecting, when said desired objective is located at said predetermined position, an address of a mount portion in which the desired objective is set, from said address indication portion;
   means for detecting a displacement of said position indication portion after said desired objective is located at said predetermined position thereby to detect a movement direction of said objective replacing means; and
   means for determining an address of another desired mount portion which is to be next located at said predetermined position, based on the address of said desired mount portion from said address detecting means and on the movement direction of said objective replacing means from said movement direction detecting means.

2. An objective replacing apparatus according to claim 1, wherein said objective replacing means further comprises means for detecting said position indication portion thereby to detect that the objective is located at said predetermined position.

3. An objective replacing apparatus according to claim 2, further comprising means for outputting, when an operator assigns another desired objective or another mount portion of said objective replacing means corresponding to said another desired objective, an assignment signal corresponding to said assigned another objective or another mount portion;
   wherein said objective replacing means moves based on the assignment signal thereby to position the assigned another objective or another mount portion at said predetermined position; and
   wherein said determining means determines the address of the another desired mount portion being to be next located at the predetermined position, based on the assignment signal from said assignment signal output means and the address of said desired mount portion from said address detecting means, or based on the address of said desired mount portion from said address detecting means and the movement direction of said objective replacing means from said movement direction detecting means.

4. An objective replacing apparatus according to claim 3, wherein said determining means includes memory for storing relative positions of addresses of said plurality of mount portions, and determines the address of said another desired mount portion to be next located at the predetermined position based on the assignment signal from said assignment signal output means, the address of said desired mount portion from said address detecting means and said relative positions of addresses of said plurality of mount portions from said memory, or based on the address of said desired mount portion from said address detecting means, the movement direction of said objective replacing means from said movement direction detecting means and said relative positions of addresses of said plurality of mount portions from said memory.

5. An objective replacing apparatus according to claim 1, wherein said objective replacing means is a revolver for selectively positioning the desired objective at the predetermined position by rotation.

6. An objective replacing apparatus according to claim 1, wherein said determining means includes memory for storing relative positions of addresses of said plurality of mount portions, and determines the address of said another desired mount portion to be next located at the predetermined position, based on the address of said desired mount portion from said address detecting means, the movement direction of said objective replacing means from said movement direction detecting means and said relative positions of addresses of said plurality of mount portions from said memory.

7. A microscope comprising:
   objective replacing means having a plurality of objective mount portions and selectively positioning at a predetermined position a desired objective out of a plurality of objectives set in said mount portions;
   a position indication portion for indicating respective positions of said plurality of mount portions, said position indication portion being disposed on said objective replacing means as to be formed corresponding to said respective mount portions;
   an address indication portion indicating respective addresses of said plurality of mount portions, said address indication portion being disposed on said objective replacing means as to be formed corresponding to said respective mount portions;
   means for detecting, when said desired objective is located at said predetermined position, an address of a mount portion in which the desired objective is set, from said address indication portion;
   means for detecting a displacement of said position indication portion after said desired objective is located at said predetermined position thereby to detect a movement direction of said objective replacing means;
   a memory for storing information of the objectives set in the respective mount portions;
   means for determining an objective set in another desired mount portion which is to be next located at the predetermined position, based on the address of said desired mount portion from said address detecting means, the movement direction of said objective replacing means from said movement direction detecting means, and the information of objectives from said memory; and
   means for controlling a part of the microscope other than the objectives, based on the objective determined by said determining means.

8. A microscope according to claim 7, wherein said objective replacing means further comprises means for detecting said position indication portion thereby to detect that the objective is located at said predetermined position.

9. A microscope according to claim 7, wherein said part of microscope is light control means located in an optical path of the microscope and controlling a light quantity of light from a light source; and
   wherein said control means controls said light control means as to control the light quantity as suitable for the objective determined by said determining means.

10. A microscope according to claim 7, wherein said part of microscope is means for changing an aperture diameter of an aperture diaphragm located in an optical path of the microscope; and
    wherein said control means controls said aperture diameter changing means as to adjust the aperture diameter of aperture diaphragm as suitable for the objective determined by said determining means.

11. A microscope according to claim 7, further comprising means for outputting, when an operator assigns a desired objective or a mount portion of said objective replacing means corresponding to said desired objective, a signal corresponding to said assigned objective or mount portion;
    wherein said determining means determines the objective set in the another desired mount portion being to be next located at the predetermined position, based on the signal from the assigning means and the information of objectives from said memory, or based on the address of said desired mount portion from said address detecting means, the movement direction of said objective replacing means from said movement direction detecting means, and the information of objectives from said memory.

12. A microscope according to claim 7, wherein said objective replacing means is a revolver for selectively positioning the desired objective at the predetermined position by rotation.

13. A microscope according to claim 7, wherein said determining means includes memory for storing relative positions of addresses of said plurality of mount portions, and determines the address of said another desired mount portion to be next located at the predetermined position based on the address of said desired mount portion from said address detecting means, the movement direction of said objective replacing means from said movement direction detecting means and said relative positions of addresses of said plurality of mount portions from said memory.

14. A microscope according to claim 7, further comprising means for outputting, when an operator assigns another desired objective or another desired mount portion of said objective replacing means corresponding to said another desired objective, a signal corresponding to said assigned another objective or another mount portion;

wherein said determining means includes memory for storing relative positions of addresses of said plurality of mount portions, and determines the address of said another desired mount portion to be next located at the predetermined position based on the assignment signal from said assignment signal output means, the address of said desired mount portion from said address detecting means and said relative positions of addresses of said plurality of mount portions, or based on the address of said desired mount portion from said address detecting means, the movement direction of said objective replacing means from said movement direction detecting means and said relative positions of addresses of said plurality of mount portions.

* * * * *